US009106793B2

(12) United States Patent
Bebbington et al.

(10) Patent No.: US 9,106,793 B2
(45) Date of Patent: Aug. 11, 2015

(54) METHOD AND APPARATUS FOR MOTION BASED PARTICIPANT SWITCHING IN MULTIPOINT VIDEO CONFERENCES

(71) Applicant: CISCO TECHNOLOGY, INC., San Jose, CA (US)

(72) Inventors: Conrad Bebbington, Slough (GB); Paul Bright-Thomas, Slough (GB)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 13/733,718

(22) Filed: Jan. 3, 2013

(65) Prior Publication Data

US 2014/0184731 A1  Jul. 3, 2014

(51) Int. Cl.
*H04N 7/14* (2006.01)
*H04N 7/15* (2006.01)

(52) U.S. Cl.
CPC ................................ *H04N 7/152* (2013.01)

(58) Field of Classification Search
USPC ......................................................... 709/204
See application file for complete search history.

(56) References Cited

U.S. PATENT DOCUMENTS

| | | | | |
|---|---|---|---|---|
| 6,300,973 | B1 * | 10/2001 | Feder et al. | 348/14.09 |
| 6,907,072 | B2 * | 6/2005 | Kawakatsu et al. | 375/240.13 |
| 7,760,952 | B2 * | 7/2010 | Seo | 382/236 |
| 2004/0136461 | A1 * | 7/2004 | Kondo et al. | 375/240.16 |
| 2004/0146109 | A1 * | 7/2004 | Kondo et al. | 375/240.16 |
| 2005/0105000 | A1 * | 5/2005 | Mertens | 348/441 |
| 2006/0072664 | A1 * | 4/2006 | Kwon et al. | 375/240.16 |
| 2007/0041446 | A1 * | 2/2007 | Seong et al. | 375/240.16 |
| 2008/0043845 | A1 * | 2/2008 | Nakaishi | 375/240.16 |
| 2013/0136170 | A1 * | 5/2013 | Sugio et al. | 375/240.02 |
| 2013/0215329 | A1 * | 8/2013 | Sroka Chalot et al. | 348/564 |
| 2013/0322543 | A1 * | 12/2013 | Sugio et al. | 375/240.16 |
| 2014/0218465 | A1 * | 8/2014 | Bright-Thomas | 348/14.09 |

OTHER PUBLICATIONS

Bill Kapralos et al., "Recognition of Hand Raising Gestures for a Remote Learning Application", Image Analysis for Multimedia Interactive Services, 2007. WIAMIS'07. Eighth International Workshop on IEEE, 2007.
Gary R. Bradski et al., "Motion Segmentation and Pose Recognition with Motion History Gradients", 6 pages.
Gary R. Bradski et al., "Motion Segmentation and Pose Recognition with Motion History Gradients", Machine Vision and Applications 13.3 (2002): 174-184.
http://www.eyesight-tech.com.
U.S. Appl. No. 13/760,736, filed Feb. 6, 2013, Bright-Thomas.

* cited by examiner

*Primary Examiner* — Maria El-Zoobi
(74) *Attorney, Agent, or Firm* — Lempia Summerfield Katz LLC

(57) ABSTRACT

In one embodiment, an apparatus comprises a memory that stores executable instructions and a processor that executes the instructions in order to determine, for plural received compressed video inputs, at least one motion vector included in each of the plural compressed video inputs; calculate, based on the determined motion vectors, a motion value corresponding to each of the plural compressed video inputs, the motion values representing a level of motion over several frames for each of the plural compressed video inputs; and select, based on the calculated motion values, at least one of the plural compressed video inputs to be displayed.

18 Claims, 7 Drawing Sheets

METHOD AND APPARATUS FOR MOTION BASED PARTICIPANT SWITCHING IN MULTIPOINT VIDEO CONFERENCES

BACKGROUND OF THE INVENTION

1. Technical Field

The present disclosure relates generally to using motion information from compressed video data to select endpoints to be shown in a multipoint video conference.

2. Background

A video conference system allows endpoints at two or more locations to communicate simultaneously by two-way video and audio transmission. Typically, powerful computer processors are used to employ video compression to reduce the amount of channel bits needed to be transmitted between endpoints. Simultaneous video conferencing among three or more remote points is made possible by way of a multi-point control unit (MCU), which bridges interconnect calls from several sources.

The MCU may also make use of voice switching, in which voice activity from the audio streams of the endpoints is used to signal which endpoints should be sending video to the MCU, thereby permitting only the endpoints which have actively speaking participants to send video to the MCU, which then transmits the video and audio steams to the other endpoints in the multipoint video conference.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

Overview

Figure 1A:
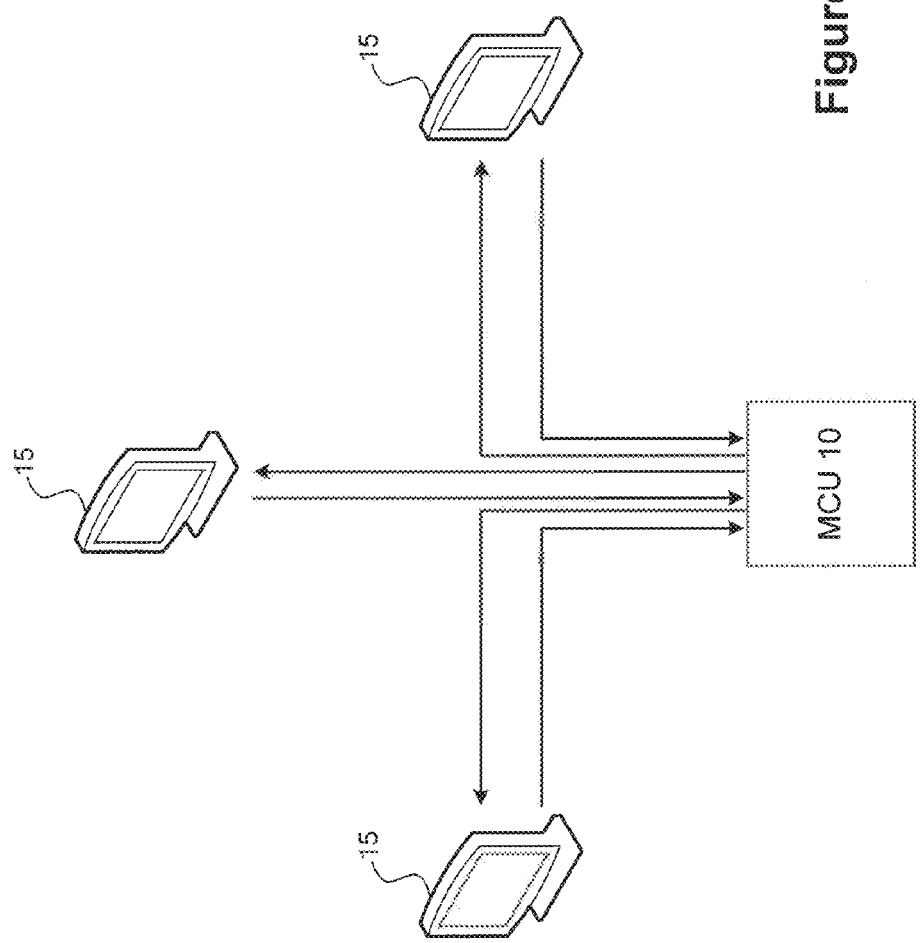
FIG. 1A illustrates an exemplary video conference system.

The present disclosure describes an apparatus that includes a memory that stores executable instructions and a processor that executes the instructions in order to determine, for plural received compressed video inputs, at least one motion vector included in each of the plural compressed video inputs; calculate, based on the determined motion vectors, a motion value corresponding to each of the plural compressed video inputs, the motion values representing a level of motion over several frames for each of the plural compressed video inputs; and select, based on the calculated motion values, at least one of the plural compressed video inputs to be displayed.

DETAILED DESCRIPTION

Referring now to the drawings, wherein like reference numerals designate identical or corresponding parts throughout the several views.

FIG. 1A illustrates an exemplary multipoint video conferencing system that includes a Motion Control Unit (MCU) 10 and a plurality of endpoints 15. In this exemplary system, the multipoint MCU 10 mixes audio and video streams from each endpoint 15 and transmits a single audio and video stream back to each endpoint 15 in the multipoint video conference. In the case that multiple displays or speakers exist at an endpoint 15, multiple video and audio streams may be sent by the MCU 10 to that endpoint. Further, the MCU 10 may send multiple video and audio streams to an endpoint for simultaneous display at the endpoint. If audio or video transcoding or transrating are required, the MCU 10 may decode and re-encode the audio or video streams transmitted to each endpoint 15.

In a non-limiting example, the MCU 10 may perform switching based on motion vectors included in compressed video streams, where the motion vectors can be used to calculate an overall motion metric for each participant endpoint. For example, motion vectors may be extracted from a video input that was encoded at an endpoint, and the extracted motion vectors can be used to calculate the overall motion value. In this way, the MCU 10 performs switching such that an audio/video stream of the endpoint 15 having participants exhibiting the highest degrees of motion, based on the motion vectors in the compressed video streams and/or the calculated motion value, is sent to the other endpoints. The audio/video streams of the endpoint or endpoints exhibiting the highest level of motion may be sent alone, or in a way that displays a particular stream (e.g., the highest motion endpoint) in a prominent position relative to the streams of the other endpoints. Prominent positioning may include, but is not limited to, displaying a larger size of window for the video, displaying a window for the video in a particular location on a screen (e.g., center screen), displaying the video as the sole window on a screen, displaying the video such that the entire screen is filled, placing a border around the window, altering the size of other endpoint video display windows relative to the prominently displayed window.

In using information which already exists in compressed video (i.e., motion vectors) to create an overall motion metric, an MCU according to the present disclosure can perform motion-based switching without tracking or classifying particular characteristics of a video stream (e.g., a gesture from a participant), thereby improving processing efficiency. Moreover, switching related processing efficiency can be further improved by utilizing external encoders (e.g., in the endpoints) to provide the motion vectors to the MCU as compressed video, and the MCU can extract or calculate the motion vectors from the encoder output. Aspects of switching based on motion vectors in compressed video streams will be discussed in further detail in later paragraphs.

Figure 1B:
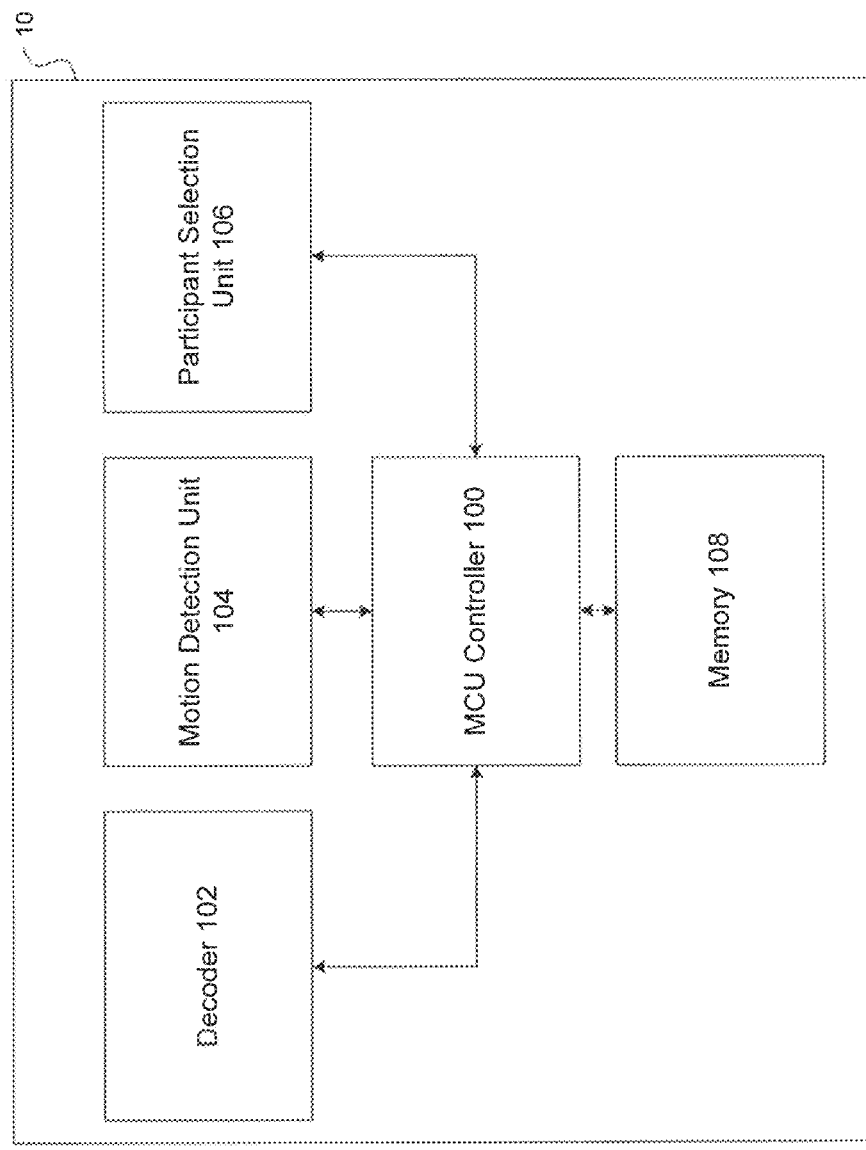
FIG. 1B illustrates an exemplary block diagram of an MCU.

Next, FIG. 1B illustrates an exemplary block diagram for the MCU 10 of FIG. 1A. As shown in FIG. 1B, the exemplary MCU 10 includes an MCU controller 100, a decoder 102, a motion detection unit 104, a participant selection unit 106, and a memory 108.

The MCU 10 receives one or more inputs that include a compressed video bitstream from, e.g., endpoint participants in a video conference. The video inputs may be compressed according to the H.264 coding standard; however, the present disclosure is not limited to video inputs received in the H.264 standard, since there are multiple comparable standards for video compression based on hybrid block-based coding with motion compensation (e.g., H.261, H.263, MPEG-2, and H.265—the latter being a successor to H.264) in which a description of motion in the transmitted bitstream is used in the compression method.

The MCU controller 100 coordinates the functions of the various elements of the MCU 10. The MCU controller 100 may include one or more processors with which to perform the MCU 10 features described herein. Further, the MCU controller 100 may utilize a memory 108 that stores instructions with which to execute these features. The memory 108 may include an MCU host application for executing the MCU 10 processing functions, and may also be used for temporary storage by the various MCU 10 elements.

The one or more compressed video inputs received by the MCU 10 are decoded using the decoder 102. The decoding process may include a process of motion compensation in which a representation of objects in the current coded frame is derived from previously coded frames, where a small number of previously coded frames, known as reference frames, are available in both the encoder and decoder. In the H.264 coding standard, motion compensation operations are performed at the level of a small square or rectangular block within the frame, and the motion compensation operation is parameterized by a motion vector. A motion vector consists of a reference to one of a list of available reference frames and a two-dimensional vector that provides an offset from coordinates of the current block in the current decoded frame to coordinates of a comparable block in the specified reference frame. That is, motion in a video stream is represented in the H.264 standard using a series of motion vectors to specify how each block of a video frame has moved relative to the a representation of the same block in a previous coded frame. Motion may be represented at multiple block sizes, with the default size being a macroblock of 16×16 samples in the luminance layer of the frame. However, H.264 allows the representation of motion at the level of sub-macroblock partitions, and a macroblock may contain up to 16 motion vectors. More motion vectors may be included if the prediction of any block is made by combining predictions from two separate reference frames (by standardized convention, this method of bi-prediction is not normally used in video conferencing).

The derivation of motion vectors by the decoder 102 may, e.g., occur during inter prediction processing of the video input. The motion vectors may be associated with one or more macroblocks in compressed video frame. Motion vectors may also be calculated by an encoder (not pictured), in which case the calculated motion vectors are extracted by the decoder 102 following receipt of the video input from the encoder.

It should be appreciated that the calculation of motion properties from uncompressed video is a very computationally intensive process, and this is the main reason that a video compression encoder is usually rated as requiring computational resources that are several times higher than the resources required by a decoder. Therefore, the present disclosure is a very economical approach to exploiting computational effort that has already been expended in the encoding process of the contributing endpoint.

Once the motion vectors are derived or extracted by the decoder 102, the motion detection unit 104 calculates a motion value representing the overall level of motion for each video frame of the respective video steam inputs, based on the derived/extracted motion vectors. Each frame of video (of which there are typically 30 or 60 per second) is broken into up to 8000 macroblocks, and each macroblock can have up to 16 motion vectors (1 is the norm, but more complex content may be coded with two, four, etc). Thus, there are many thousands of motion vectors for a given frame, and the process of calculating a motion value aggregates this information to provide a representative number for the degree of motion in the picture, thereby allowing frames, and ultimately streams, to be compared.

As a non-limiting example, the motion value may be calculated by summing the magnitude of motion vectors for each macroblock in a video frame. Where macroblocks have multiple motion vectors, then just one default motion vector can be chosen as representative. Alternatively, the magnitudes of motion vectors may be averaged across the macroblock, or the highest magnitude motion vector in the macroblock may be used in the motion value calculation. Where macroblocks are coded as "skip," the motion properties of the macroblock are not coded explicitly in the bitstream, but instead may be derived from neighboring macroblocks (e.g., immediately above and to the left), and the derived motion vector may be used. Motion vectors may refer to one of a set of reference frames, where each reference frame is a decoded frame from some point in the past relative to the frame currently being decoded. For motion of constant speed, the value of the motion vector will scale with the temporal distance from the current frame to the reference frame to which the motion vector refers, and the magnitude of motion should be downscaled by this temporal distance to remove the effect of the choice of reference frame from the apparent scale of motion.

Some block types in the H.264 compression standard do not contain motion vectors. In this case, the motion detection unit 104 calculates a dummy value as the motion value. The dummy value is used for macroblocks that do not code motion, but instead make a prediction by a spatial extrapolation of the picture content of neighboring macroblocks—a mechanism known as intra prediction. This type of macroblock may be used for a variety of reasons, including prediction of objects that simply are not visible in prior decoded frames used as references for motion compensation, objects that are displaced by other than pure linear motion (including rotation either within or relative to the plane of the image, or magnification), objects that are deformed relative to previous representations, or objects that are lit differently in previous frames and so cannot be simply matched.

Moreover, this form of prediction may also be used when the motion analysis performed by the encoder is not able to find a suitable representation in an available reference picture due to the computational or algorithmic limits of the implementation of that process in the encoder that generated the bitstream in question. Quite simply, even if the block currently coded is present in an available reference frame in an undistorted form, the encoder motion estimation process may be defined to only look with a certain spatial range of the nominal position of the block in question, or run out of time to do so, and in either case the intra mode of prediction can be used as a substitute representation of the block currently coded. It is therefore common that high motion passages of video will contain macroblocks of this kind, which have no explicit motion properties, although they may be included for other reasons.

For the purposes of this disclosure, it is desirable to assign those blocks not coded for motion a proxy motion magnitude (i.e., a "dummy" value). This value may be derived from the properties of neighboring blocks that do have obvious motion properties, or may be an assigned value based on the known or estimated limits of the range of the motion estimation process in the encoder (this is implementation dependent and may be quite unknown, but is usually fairly restricted).

Assigning such blocks estimated motion magnitude does have the potential to create fake motion when intra prediction has been used for non-motion reasons, particularly when lighting has changed. Separating real motion from lighting-dependent changes is a complex computational problem, and may undesirably complicate the motion metric calculation. A choice can be made to ignore the motion properties of a frame altogether if the proportion of intra macroblocks is so high that it seems likely that there is little real motion in the scene, or that the motion which is present has been totally masked by the lighting changes. It is also within the available computation of the present disclosure to determine that average levels of the picture have changes so great relative to an earlier picture that this change is likely to be due to lighting change, rather than movement of objects within the scene described by the picture. Furthermore, the encoder may use a frame consisting entirely of intra-predicted macroblocks when this frame cannot be predicted from a previous frame because i) the scene has changed completely (common with edited content or switched video sources), or ii) the decoder has signaled that previous pictures are not available because of losses in the transmission channel between decoder or encoder. These frames have no calculable motion properties and should be excluded from the motion metric process entirely. In short, the dummy value assigned to isolated intra macroblocks is usually a medium-to-high motion magnitude value.

Once the motion value (dummy or otherwise) for a video frame in the video input has been calculated, the motion value may be scaled according to a video resolution of the video frame. This allows the motion of streams with different resolutions and/or from multiple endpoint participants to be normalized for comparison. For simplicity, the motion values scaled according to video resolution are referred hereinafter as first scaled values.

The first scaled motion values are averaged over a number of video frames and once determined, a message containing the first scaled motion values is sent to the MCU controller 100 so that subsequent processing may be performed. The first scaled values may be transmitted to the MCU controller 100 for analysis several times per second.

A process of selecting a particular video stream for display (i.e., selecting a participant endpoint's audio/video output to promote for display in the video conference) is performed by the participant selection unit 106 under control of the MCU controller 100. The first scaled values calculated by the motion detection unit 104 are processed by the participant selection unit 106 to establish floating averages for the minimum and maximum motion levels of motion present in the video stream input. As discussed later in further detail, these averages are used to perform additional scaling on the first scaled values before they are compared.

Regarding the use of floating averages in the scaling process, there are many factors of the endpoint set-up that could affect the magnitude of motion vectors generated in its video and therefore, affect the motion value calculated from them. Exemplary factors that could affect motion vector magnitude include the level of camera zoom (zoomed in would produce larger motion vectors relative to the same stream content under less zoom), and the inclusion of room furniture (having a meeting room table in view will give a large part of the picture with no motion). The floating minimum and maximum averages described herein are calculated to provide a baseline of the range of values the video from a given endpoint set-up produces, and scaling is then used so that the motion values from different endpoints will vary over the same range and can be compared.

For simplicity, the scaled motion values resultant from floating average-based scaling of the first scaled values are referred to hereinafter as second scaled values.

In the comparison processing, the participant endpoints in the video conference are arranged in an ordered list by the participant selection unit 106, based on the second scaled values. The ordering may list the video streams from highest to lowest with respect to the second scaled values; however, other ordering priorities may be utilized. Based on the ordering, the participant selection unit 106 may perform a switching process to determine one or more endpoint video and audio streams to transmit to the participant endpoints in the video conference.

The participant selection unit 106 may perform the above switching using a "motion" mode. In the motion mode, the participant selection unit 106 may utilize the ordered list to output the endpoint video streams that exhibit the highest levels of motion to the other participant endpoints in the video conference. As a non-limiting example of the motion mode, there may be a case in which a video conference is conducted entirely in sign language. In this case, a high motion value is indicative that a conference participant is communicating at one of the endpoints and therefore, the corresponding endpoint should be promoted for display amongst the video conference participants via the MCU 10. Thus, under motion mode switching in this example, the participant endpoint exhibiting the highest motion (typically the endpoint with the current speaker) will be promoted for display at the other endpoints. While an audio-based switching process that relies solely on analyzing audio output amongst the video conference participants would likely not be effective in this example, the motion-based switching methods of the present disclosure would allow for accurately promoting/displaying video streams based upon features indicating motion in compressed video.

The participant selection unit 106 may also perform switching using a "hybrid" mode. In the hybrid mode, the participant selection unit 106 may utilize audio-based switching to select/promote the most "important" participant endpoint stream for display (e.g., the endpoint with the current speaker), and also use the ordered list of second scaled values to select other additional participant endpoint streams to display based on motion. According to the present disclosure, audio-based switching results in displaying video stream inputs based upon characteristics of an associated audio signal in the input streams (e.g., the current speaker is displayed based on comparing the audio component of participant input streams). Consequently, the participant selection unit 106 operating in hybrid mode may cause both the current speaker (i.e., the endpoint selected based on audio characteristics), as well as those participants who are physically reacting in some way to the speaker, to be simultaneously displayed to the participant endpoints. This provides for the video conference participants to view non-verbal communication (e.g., gestures, body language, etc.) from other participants, which may otherwise be missed when performing switching based solely on audio signals.

Regarding the hybrid mode, there is a further model whereby motion characteristics can be used to validate the audio selection, and in some case override that choice. This can occur in a multi-screen endpoint system consisting of multiple microphones cameras and screens, and which contributes multiple audio and video streams to the conference (a common case for an immersive conferencing experience). By using directional microphones, an audio stream is encoded that is associated with the field of view described by each individual video stream, and the audio stream can be used to select the corresponding video stream. Where a single video stream from the multi-screen endpoint is to be shown to participants (for the purposes of focus on a single active speaker at the multi-screen endpoint), the video stream associated with the loudest audio stream is usually selected. In some cases, acoustics of the endpoint environment can be modified (e.g., by the placement of objects close to the microphones) such that the audio from the loudest speaker is picked up on the wrong microphone, which may result the selection of a video stream that does not show the active participant, and in some cases may show an entirely empty view. This condition can be prevented in the hybrid mode by the comparison of motion statistics for the video streams ranked by audio characteristics, and if the choice of the loudest stream is marginal, and if the loudest stream has significantly less motion than the second loudest stream, it can be inferred that an error in the audio-based selection may have occurred, and that a better choice of video stream would be to display the stream selected on motion-based characteristics (e.g., by performing switching in the above-described motion mode).

It should be appreciated that the participant selection unit 106 is not limited to selecting a single participant video input for display. Rather, the participant selection unit 106 may display a plurality of video inputs to the video conference participant endpoints based on the foregoing exemplary processing. For example, a predetermined number of video inputs having the highest calculated second scaled values may be promoted by the participant selection unit 106 to be concurrently displayed in the video conference. Further, the above examples discuss using scaled motion values to perform various calculations, which should not be viewed as limiting. Rather, motion-based switching according to the present disclosure may be implemented by analyzing unscaled motion values from compressed video.

Further, the participant selection unit 106 may also perform a smoothing process prior to the above-described comparison processing, but the use of smoothing is not limiting.

Figure 2:
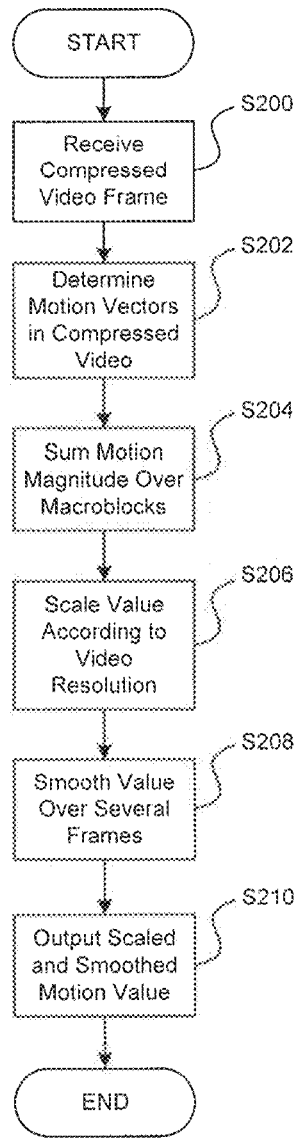
FIG. 2 illustrates an exemplary method of processing compressed video by the MCU of FIG. 1B.

Next, FIG. 2 illustrates an exemplary method of processing compressed video by MCU 10 using motion vectors in the compressed video to determine an overall motion value for an endpoint output stream.

Referring to FIG. 2, the MCU 10 at step S200 receives a compressed video input from each of one or more participant endpoints. The compressed video may, e.g., be received from one or more participant endpoints in a video conference. Once the compressed video input is received, the MCU 10 determines one or more motion vectors in the compressed video at step S202. There will be many motion vectors (e.g., from 100 to 10,000 per frame) depending on resolution, although a variable number of motion vectors may be present even for frames of a fixed resolution. Some (or all) of these motion vectors may be zero if there is little motion in the present scene, in which case a dummy value may be used. The motion vectors are predetermined by the encoding process in the contributing endpoint, and the MCU 10 extracts the motion vectors according to the MCU's specified decoding process, as per the appropriate video compression standard. According to the present disclosure, the primary use of the motion vectors is for motion compensation and this process should coincide with that of the source encoder, or the description of video will diverge, which results in invalid video being displayed. As discussed later in further detail, the motion vectors are utilized in the present disclosure in the derivation of a global measure of motion in the scene for the purposes of dynamic scene-adaptive reconfiguration of the view of the video conference presented to the participants. The values of the motion vectors may also be used to derive a representative measure of motion in the present frame, and may be combined with similar measures made in other frames to provide a stable representation of the current degree of motion in the scene described by the video stream.

Once the motion vectors are determined at S202, a motion value representing the overall level of motion for each video frame of the compressed video input is calculated at step S204, based on the derived/extracted motion vectors. As a non-limiting example, the motion value may be calculated by summing the derived/extracted motion vectors magnitudes across macroblocks associated with a video frame in the compressed video input. At step S206, the calculated motion value is scaled based on the resolution of corresponding frames in the received video input. At step S208, the scaled motion value is smoothed over several frames prior to outputting the motion value at step S210 for subsequent processing.

Temporal filtering may also be used by the decoder 102 in step S208 to identify motion that is, e.g., of human origin rather than mechanical or electrical sources (e.g., flashing lights or graphics in the background); however, the present disclosure is not limited to incorporating such filtering.

Next, an exemplary process of scaling motion values using a floating average will be described with respect to FIG. 3.

Figure 3:
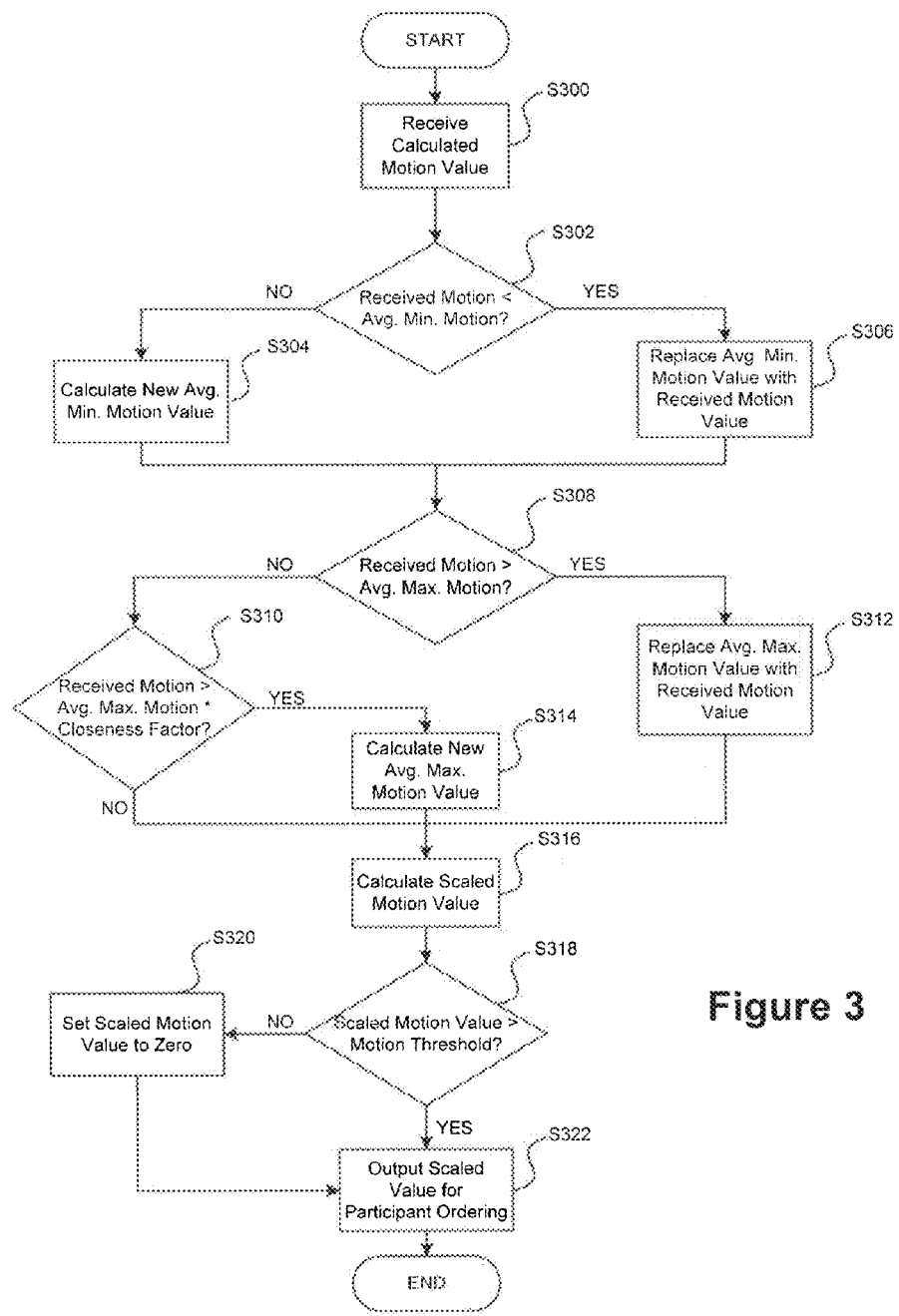
FIG. 3 illustrates an exemplary method of scaling motion values calculated motion vectors from compressed video.

Referring to FIG. 3, the MCU 10 first receives a calculated motion value at step S300 and determines whether the received motion value is greater than an average minimum motion value (S302). The received motion value may be calculated using the exemplary method of FIG. 2, or by another method. The average minimum motion value may be calculated and stored in advance as a historical floating average based on previously analyzed motion values. If the received motion value is less than the current average minimum motion value, a new average minimum motion value is calculated and stored at step S304. Otherwise, if the MCU 10 determines the received motion value is greater than the current average minimum motion value, the average minimum motion value is replaced in the memory 108 with the received motion value (S306).

The MCU 10 determines at step S308 whether the received motion value is greater than an average maximum motion value. The average maximum motion value may be calculated and stored in advance as a historical floating average based on previously analyzed motion values. If the received motion value is greater than the average maximum motion value, the average maximum motion value is replaced in the memory 108 with the received motion value (S312). Otherwise, if the received motion value is less than the average maximum motion value, the MCU 10 determines whether the received motion value is greater than the product of the average maximum motion value multiplied by a closeness factor at step S310. The closeness factor is a factor used to determine if a motion value is close enough to the stored maximum motion value to be factored into the calculation of the maximum floating average. The closeness factor may be defined such that only a predetermined percentage of motion values (e.g., the top 30%) affect the maximum floating average. This allows the maximum floating average value to be brought down after an exceptionally high period of motion, but prevents it from being reduced in periods of inactivity. If the received motion value is greater than the product calculated at S310, a new average maximum motion value is calculated at step S314.

At step S316, the MCU 10 calculates a scaled motion value. As a non-limiting example, the motion values are scaled linearly so that an input motion value equal to the minimum floating average gives an output of 0 and an input motion value equal to the maximum floating average gives a maximum output value of 10000; however, other values may be used. An exemplary equation used for scaling the motion values is shown below:

$$\left(\frac{\text{Input Motion Value} - \text{Average Minimum Motion Value}}{\text{Average Maximum Motion Value}}\right) \times \text{Desired Maximum Output Value}$$

The MCU 10 determines at step S318 whether the calculated scaled motion value is greater than a motion threshold. The motion threshold is a value chosen such that motion below a predetermined level is excluded, thereby preventing unnecessary re-ordering of the endpoint participant list in later processing. If the scaled motion value is less than the motion threshold, the scaled motion value is set to zero (i.e., the scaled motion value is excluding from participant endpoint ordering). If the scaled motion value is greater than the motion threshold, or of the scaled motion value is set to zero, the MCU 10 at step S322 outputs the scaled motion value for participant endpoint ordering.

Figure 4:
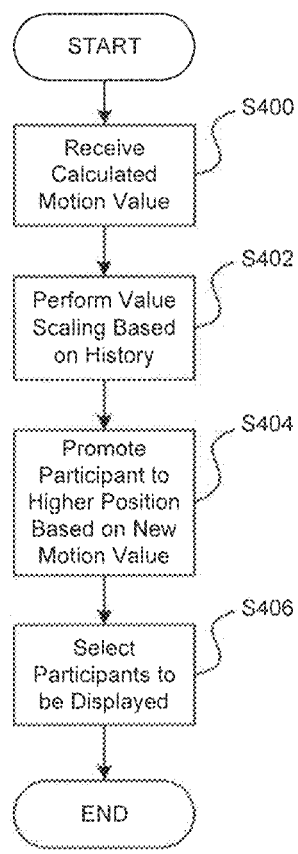
FIG. 4 illustrates an exemplary method for selecting participant endpoints to be displayed in a video conference.

Next, FIG. 4 illustrates an exemplary method for the MCU 10 to select participant endpoints to be displayed in a video conference.

Referring to FIG. 4, the MCU 10 first receives calculated motion values at step S400. The motion values may, e.g., be calculated using the method of FIG. 2, or by another method. Further, a plurality of motion values corresponding to the respective motion at each participant endpoint may be received at S400, where the MCU 10 can analyze the plurality of motion values in order to determine which endpoint should be promoted for display at all conference participant endpoints, based on the motion values.

At step S402, the MCU 10 performs scaling on the received motion values based on a historical floating average. The scaling performed at S402 may be similar to the exemplary method illustrated in FIG. 3.

At step S404, the MCU 10 analyzes the scaled motion values and orders participant endpoints based on their corresponding scaled motion value. For example, in the case where a plurality of motion values corresponding to each endpoint in the conference are received, the MCU 10 scales each motion value and creates an ordered list of the scaled values. The ordered list may be arranged such that the scaled values are listed from the highest scaled motion value to the lowest scaled motion value, or other ordering may be used to represent relative motion amongst endpoints.

At step S406, the MCU 10 uses the ordered list of scaled motion values to select a participant endpoint to be displayed to all participant endpoints in the video conference. For example, the MCU 10 may select one or more endpoints exhibiting the highest motion levels in their respective video streams, based on the scaled motion values, for display amongst all participant endpoints.

As an alternative or in addition to the exemplary process of selecting participant endpoints for display discussed above for step S406, the MCU 10 may employ a hybrid mode of participant selection. In the hybrid mode, the MCU 10 may utilize audio-based switching to select/promote the most "important" participant endpoint stream(s) for display (e.g., the endpoint with the current speaker), and also use the ordered list of scaled motion values to select other additional participant endpoint streams to display. Consequently, both the current speaker, as well as those participants who are physically reacting in some way to the speaker, can be simultaneously displayed to the participant endpoints.

As discussed previously, the hybrid mode processing may be augmented such that motion characteristics are used to validate audio-based participant ordering and/or switching results. For example, the MCU 10 may perform a comparison of motion statistics for the video streams ranked by audio characteristics at step S406, and if the choice of the loudest stream is marginal in terms of audio, and if the loudest stream has significantly less motion than the second loudest stream, the MCU 10 can identify that an error in the audio-based selection may have occurred, and display the stream selected on motion-based characteristics rather than audio-based characteristics. Alternatively, a stream having the highest combined motion and audio based characteristics could be displayed in lieu of, or in addition to, the audio-based selection.

Figure 5:
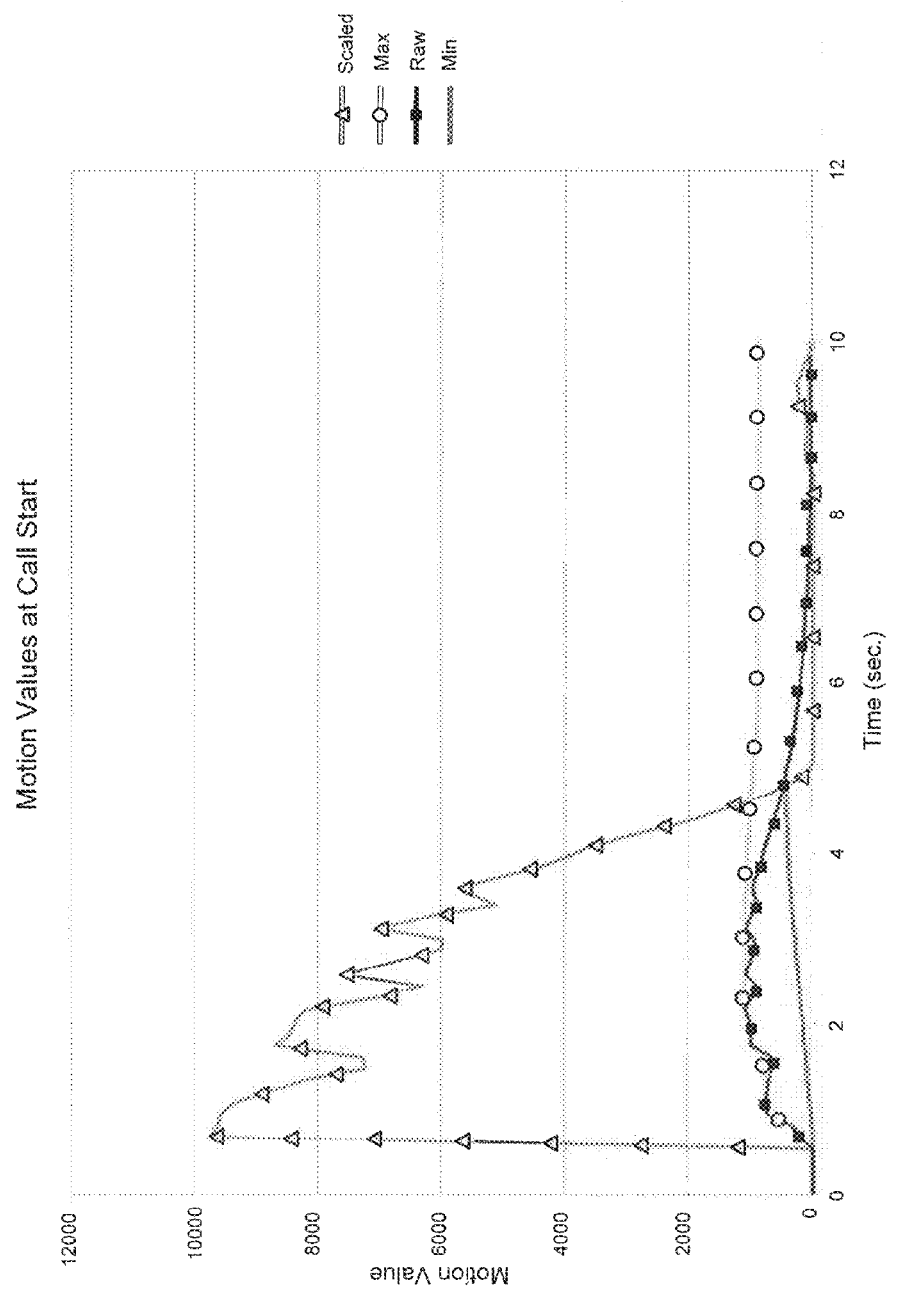
FIG. 5 illustrates an exemplary graph of motion values during a video conference.

Next, FIG. 5 illustrates an exemplary graph of motion values calculated based on motion vectors in a compressed video. The graph includes plots for raw motion values, scaled motion values, and running average maximum and minimum values. In this non-limiting example, the compressed video input includes motion of a human participant moving away from the endpoint's video camera. As emphasized by the scaled motion value plot, the motion vectors in the compressed video input can be used to develop metrics for quantitative comparison of motion between endpoints, and corresponding endpoint switching based upon the motion values.

Figure 6:
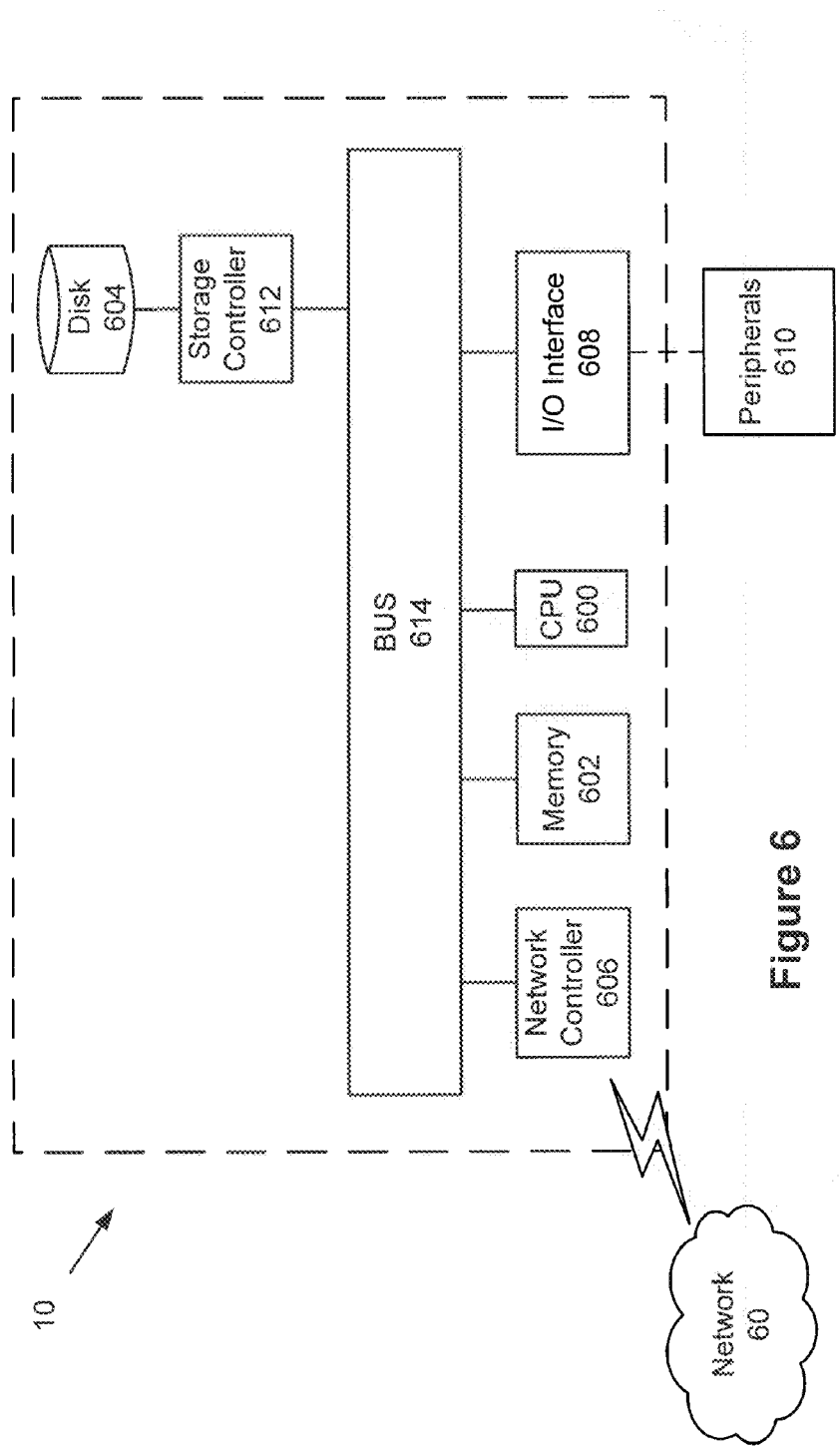
FIG. 6 illustrates an exemplary hardware structure for an MCU.

Next, a hardware description of the MCU 10 according to exemplary embodiments is described with reference to FIG. 6. In FIG. 6, the MCU 10 includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the MCU 10 communicates, such as a server or computer.

Further, the claimed advancements may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The MCU 10 in FIG. 6 also includes a network controller 606, such as an Intel Ethernet PRO network interface card from Intel Corporation of America, for interfacing with network 60. As can be appreciated, the network 60 can be a public network, such as the Internet, or a private network such as an LAN or WAN network, or any combination thereof and can also include PSTN or ISDN sub-networks. The network 60 can also be wired, such as an Ethernet network, or can be wireless such as a cellular network including EDGE, 3G and 4G wireless cellular systems. The wireless network can also be WiFi, Bluetooth, or any other wireless form of communication that is known.

The MCU 10 further includes a general purpose I/O interface 608 that interfaces with a variety of peripherals 610, such as a display or keyboard.

The general purpose storage controller 612 connects the storage medium disk 604 with communication bus 614, which may be an ISA, EISA, VESA, PCI, or similar, for interconnecting all of the components of the MCU 10. A description of the general features and functionality of the peripherals 610, storage controller 612, network controller 606, and general purpose I/O interface 608 is omitted herein for brevity as these features are known.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The invention claimed is:

1. An apparatus comprising:
a memory that stores executable instructions; and
a processor that executes the instructions in order to:
   determine, for plural received compressed video inputs, at least one motion vector included in each of the plural compressed video inputs;
   calculate, based on the determined motion vectors, a motion value corresponding to each of the plural compressed video inputs, the motion values representing a level of motion over several frames for each of the plural compressed video inputs;
   select a highest motion value based on the calculated motion values and a corresponding one of the plural compressed video inputs to be displayed; and
   identify one of the received plural compressed video inputs having a largest magnitude audio signal strength to be displayed at a same time as the at least one of the plural compressed video inputs selected to be displayed based on the calculated motion values.

2. The apparatus of claim 1, wherein the processor scales the motion values based on a temporal distance from a current frame of the compressed video input to a reference frame corresponding to the at least one motion vector.

3. The apparatus of claim 1, wherein the processor generates an ordered list of the motion values, the ordered list being based on relative magnitudes of the calculated motion values.

4. The apparatus of claim 1, wherein:
the calculated motion value represents a measure of motion contributed to a video conference by a received compressed video input,
for each frame in the plural compressed video inputs, the processor calculates the motion value by averaging the motion vectors included in the frame, and
for a predetermined number of successive frames included in the received compressed video input, the processor averages the motion values derived from individual frames to provide a stabilized motion value.

5. An apparatus comprising:
a memory that stores executable instructions; and
a processor that executes the instructions in order to:
   determine, for plural received compressed video inputs, at least one motion vector included in each of the plural compressed video inputs;
   calculate, based on the determined motion vectors, a motion value corresponding to each of the plural compressed video inputs, the motion values representing a level of motion over several frames for each of the plural compressed video inputs; and
   select, based on the calculated motion values, at least one of the plural compressed video inputs to be displayed,
   wherein in response to a macroblock of one of the compressed video inputs not including a motion vector, the processor uses a dummy value as a motion value for the macroblock, said dummy value being based on motion properties of macroblocks temporally adjacent to the macroblock.

6. The apparatus of claim 1, wherein following the calculation of the motion values, the processor determines a set of first scaled values by scaling each calculated motion value based on a resolution of a corresponding one of the plural compressed video inputs.

7. The apparatus of claim 6, wherein the processor determines a set of second scaled values by scaling the first scaled values based on a floating average of minimum and maximum motion values.

8. The apparatus of claim 1, the processor is further configured to:
display the identified decompressed video input having the largest corresponding audio signal strength simultaneously with the at least one of the plural compressed video inputs selected to be displayed based on the calculated motion values.

9. A method comprising:
determining, by a processor for plural received compressed video inputs, at least one motion vector included in each of the plural compressed video inputs;
calculate, by the processor based on the determined motion vectors, a motion value corresponding to each of the plural compressed video inputs, the motion values representing a level of motion over several frames for each of the plural compressed video inputs;

selecting, by the processor based on the calculated motion values, at least one of the plural compressed video inputs to be displayed;

selecting the compressed video input, of the received plural compressed video inputs, having a largest magnitude corresponding audio signal strength, and displaying the selected video input having the largest corresponding audio signal strength simultaneously with the at least one of the plural compressed video inputs selected to be displayed based on the calculated motion values.

10. The method of claim 9, wherein the processor selects one of the plural compressed video inputs with a largest calculated motion value.

11. The method of claim 9, wherein the processor scales the motion values based on a temporal distance from a current frame of the compressed video input to a reference frame corresponding to the at least one motion vector.

12. The method of claim 9, wherein the processor determines at least one motion vector, of at least one of the plural compressed video inputs, during inter prediction processing.

13. The method of claim 9, wherein the processor generates an ordered list of the motion values, the ordered list being based on relative magnitudes of the calculated motion values.

14. The method of claim 9, wherein:
the calculated motion value represents a measure of motion contributed to a video conference by a received compressed video input, and
for each frame in the plural compressed video inputs, the processor calculates the motion value by averaging the motion values included in the frame.

15. The method of claim 9, further comprising:
in response to detecting that a macroblock included in one of the compressed video inputs does not include a motion vector, using, with the processor, a dummy value as the motion value for the macroblock, said dummy value being based on motion properties of macroblocks temporally adjacent to the macroblock.

16. The method of claim 9, wherein following the calculation of the motion values, the processor determines a set of first scaled values by scaling each calculated motion value based on a resolution of a corresponding one of the plural compressed video inputs.

17. The method of claim 16, wherein the processor determines a set of second scaled values by scaling the first scaled values based on a floating average of minimum and maximum motion values.

18. A non-transitory computer readable medium having instructions stored therein that when executed by a processor causes a computer to perform a method comprising:
determining, for plural received compressed video inputs, at least one motion vector included in each of the plural compressed video inputs;
calculate, based on the determined motion vectors, a motion value corresponding to each of the plural compressed video inputs, the motion values representing a level of motion over several frames for each of the plural compressed video inputs;
performing a comparison of the calculated motion values;
selecting a highest of the calculated motion values for one of the plural compressed video inputs to be displayed; and
identifying one of the received plural compressed video inputs having a largest magnitude audio signal strength to be displayed at a same time as the at least one of the plural compressed video inputs selected to be displayed based on the calculated motion values.

\* \* \* \* \*